Patented May 9, 1933

1,908,338

UNITED STATES PATENT OFFICE

JAMES A. FRANCEWAY, OF BATON ROUGE, LOUISIANA, ASSIGNOR TO STANDARD OIL DEVELOPMENT COMPANY, A CORPORATION OF DELAWARE

PROCESS FOR THE REACTIVATION OF CATALYSTS USED IN THE HYDROGENATION OF HYDROCARBON OILS

No Drawing.  Application filed June 23, 1930. Serial No. 463,347.

The present invention relates to improvements in the method of revivifying catalytic materials and more specifically comprises an improved process for reactivating catalysts used in the hydrogenation of hydrocarbon oils. My invention will be fully understood from the following description which sets forth preferred methods for carrying out my process.

In the catalytic hydrogenation of hydrocarbon oils, such as reduced petroleum crudes, petroleum distillates, or fractions therefrom, or tar oils, it has been found that there is a slow decrease in catalytic activity over long periods of time. Such loss of activity is not caused by catalyst poisons such as arsenic, sulfur and the like, but appears to be caused by a gradual accumulation of tarry hydrocarbons, or perhaps solid carbon, which coat the active surface of the catalyst and tend to close its pores. In some cases the loss in activity is brought about by operation under unsuitable conditions, such as too high a temperature, insufficient hydrogen and the like.

I have found that catalysts may be brought back to their original activity, or nearly thereto, by the action of certain gases or gas mixtures at elevated temperatures, with or without the aid of high pressures.

The catalysts used in the hydrogenation of hydrocarbon oils comprise oxides or sulfides of metals such as chromium, molybdenum, tungsten, either alone or in mixture with each other, or with other materials such as the oxides or sulfides of alkali metals, alkaline earth metals, rare earth metals, zinc oxide, alumina and the like. These catalysts are not poisoned by the sulfur compounds in petroleum oils and are suitably classified as sulfactive catalysts. These materials may be packed into the hydrogenation retort in the form of lumps, or may be supported upon trays or upon other inert materials, or the catalysts may be finely ground and suspended in the oil.

Hydrogenation may be carried out in any suitable manner, for example in batch or continuously in a suitable high pressure retort with a gas rich in free hydrogen and in the presence of a catalyst as above mentioned. The temperature is ordinarily between the limits of 650° and 1000° F., although it may be higher or lower if desired. Pressure is in excess of about 20 atmospheres, and preferably in the neighborhood of 100 or 200 atmospheres, although 1000 atmospheres or more may be employed in certain cases. Hydrogen, or gas rich in hydrogen, is forced directly into the hydrogenation retort. The oil may be in the liquid or vapor phase in the retort, depending on the temperature and the density of the oil, and may be removed from the retort as vapor or liquid. If in the liquid phase, the oil may be removed along with the vapor and gas, or may be withdrawn separately.

Loss of activity of the catalyst generally does not make itself manifest for a month or longer and then shows a small decrease as indicated by the quality of the product. It has previously been proposed to reactivate these catalysts through washing with benzol as in Peck, Ser. No. 406,634, by treatment with hydrogen at elevated temperature as in Peck, Ser. No. 407,019, or by the action of gases containing combined oxygen as proposed by Wright and Ralston in Ser. No. 408,666. I have now found that gases containing free oxygen are very effective at elevated temperatures in restoring the activity of the catalysts.

In the operation of my process where the activity of the catalyst has decreased to a predetermined value, the oil is first separated from the catalyst. If the catalyst is in a finely ground condition suspended in the oil, it may be removed by filtration, settling, or centrifugal means, but in the case of a packed catalyst, the oil is drained and the catalyst left in place in the retort. The catalyst is then extracted to remove as much of the adhering oily material as possible by means of any suitable solvent such as benzol, naphtha, or the like. Following this, steam may be passed through the catalyst at low pressures in order to steam distill any remaining hydrocarbon material from the catalyst. If desired, the solvent treatment may be omitted and steam distillation relied upon alone, or solvent extraction only may be employed.

When the solvent or steam has removed as much hydrocarbon material as is possible by this means, the temperature of the catalytic material is slowly brought up in any suitable manner, for example by passing superheated steam, or hot gases such as nitrogen, carbon dioxide and the like over the catalyst, preferably at substantially atmospheric pressure. When the temperature of the catalyst reaches about 700° F. a small amount of oxygen or air is introduced with the hot gas or steam. Sufficient oxygen or air is added to provide about 2 to 5 percent oxygen in the incoming gas. This oxidation treatment is then carried out under slowly increasing temperatures and oxygen concentration. The temperature is preferably raised with 1 to 4 hour periods of constant temperature at intervals of every 50 to 100° F., although it will be understood that the time of treatment depends largely on the condition of the catalyst. The total time of treatment is ordinarily about 4 to 20 hours. The maximum temperature may be taken as about 900° F. at which point the oxygen content of the oxidizing gas may preferably be about 15 to 25 percent. It will be understood that I may carry out my reactivation at one temperature in the range specified, and with one oxygen concentration, or I may operate with one of these variables constant while I vary the other. Near the end of the treatment the pressure may be raised to about 20 to 100 atmospheres in order to effect oxidation deep within the catalyst lumps. It is not desirable, however, to continue this pressure treatment for too long a period since high pressure does not favor the formation of oxidation products. Furthermore, it is preferable, though not necessary, to raise the rate of gas flow during the treatment as the temperature is increased. The rate at the start may be 2 to 6 volumes of inlet gas per volume of catalyst per hour and may be increased to 8 to 15 volumes per volume per hour toward the end of the treatment. After the treatment it is preferable to cool the catalyst slowly and in such a way that no moisture is left upon the active surfaces. This may be effected, for example by employing dry gases rather than steam after the catalyst has cooled to 300° F.

As an example of one method of carrying out my oxygen treatment, the following schedule may be employed preferably after the catalyst has been freed of adhering oily material by solvent and/or steam treatment. In the table below, the first three hour period is used to bring the temperature of the catalyst up to 700° F. The gas rate is expressed in volumes of inlet gas per volume of catalyst per hour, and the percent oxygen refers to the amount of oxygen in this gas, which may consist of a mixture of steam and varying amounts of air. In the last 2½ hours of treatment, and in the final cooling period, air alone is used, as the oxygen content indicates.

| Time | Temperature | Percent oxygen | Gas rate | Pressure |
|---|---|---|---|---|
| 3 hrs | Up to 700° F | 0 | 4 | 1 atm. |
| 2 hrs | At 700° F | 5 | 4 | 1 atm. |
| 2 hrs | At 800° F | 5 | 6 | 1 atm. |
| 2 hrs | At 850° F | 10 | 8 | 1 atm. |
| 2 hrs | At 900° F | 10 | 10 | 1 atm. |
| 2 hrs | At 900° F | 21 | 10 | 1 atm. |
| ½ hr | At 900° F | 21 | 10 | 50 atm. |
| 5 hrs | Cool | 21 | 4 | 1 atm. |

As mentioned above, gases such as nitrogen, carbon dioxide, and carbon monoxide may be used instead of, or with steam, to dilute the oxygen. Flue gases may be employed for this purpose, although it is advisable to use gases cleaned of soot and fine particles of ash or the like. After the treatment with oxygen has been concluded, it is often preferable to pass substantially pure hydrogen over the catalyst. The hydrogen may be introduced at any point during the catalyst cooling period, preferably after the catalyst has cooled to below 700° F. or it may be employed after the catalyst has cooled, or before. The hydrogen treatment may be carried out at any desirable pressure, for example 50, 100 or 200 atmospheres, or atmospheric pressure may be employed.

This invention is not to be limited by any theory of the mechanism of the reactions nor to any specific example which may have been given for illustrative purposes, but only by the following claims in which it is wished to claim all novelty inherent in this invention.

I claim:

1. In the process of hydrogenating hydrocarbon oils with free hydrogen in contact with a sulfactive catalyst under a pressure in excess of 20 atmospheres, the step of reactivating the said catalyst which comprises separating the bulk of the oil from said catalyst and subjecting the said catalyst at an elevated temperature to the action of a gas containing free oxygen.

2. Process according to claim 1 in which the temperature is in excess of about 700° F.

3. Process according to claim 1 in which the gas consists of air and steam.

4. In the process of hydrogenating hydrocarbon oils with free hydrogen in contact with a sulfactive catalyst under a pressure in excess of 20 atmospheres, the step of reactivating the said catalyst which comprises separating the bulk of the oil from said catalyst and subjecting the said catalyst at temperatures of 700° F. to 900° F. to the action of a gas containing 2 to 25% free oxygen.

5. In the process of hydrogenating hydrocarbon oils with free hydrogen in contact with a sulfactive catalyst under a pressure in excess of 20 atmospheres, the step of reactivating the said catalyst which comprises separating the bulk of the oil from said catalyst and subjecting said catalyst under conditions of slowly rising temperature to the action of a gas containing 2 to 25% free oxygen.

6. An improved process for reactivating sulfactive catalysts used for the hydrogenation of hydrocarbon oil with free hydrogen at a pressure in excess of 20 atmospheres, which comprises separating the bulk of the oil from the said catalyst and subjecting said catalyst under conditions of slowly rising temperature in which the temperature is raised from 700 to 900° F. with two to five hour periods of constant temperature at temperature intervals of about 50 to 100° F., to the action of a gas containing 2 to 25% free oxygen.

7. In the process of hydrogenating hydrocarbon oils with free hydrogen in contact with a sulfactive catalyst under a pressure in excess of 20 atmospheres, the step of reactivating the said catalyst which comprises separating the bulk of the oil from said catalyst and subjecting the said catalyst for a period of about 4 to 20 hours under conditions of slowly rising temperature to the action of a gas containing a varying amount of free oxygen between the limits of 2 to 25%.

8. In the process of hydrogenating hydrocarbon oils with free hydrogen in contact with a sulfactive catalyst under a pressure in excess of 100 atmospheres, the step of reactivating the said catalyst which comprises separating the bulk of the oil from said catalyst and subjecting said catalyst for a period of about 4 to 20 hours under conditions of slowly rising temperature to the action of a gas containing a varying amount of free oxygen between the limits of 2 to 25% and under conditions in which the temperature is raised from about 700 to 900° F. while the oxygen content of the gas is simultaneously raised from 5 to 21%.

9. Process according to claim 4 in which the catalyst comprises compounds of metals of group VI selected from the group consisting of oxides and sulfides of chromium, molybdenum, and tungsten.

10. Process according to claim 7 in which the last ½ to 2 hours of the reactivation treatment are conducted under superatmospheric pressure.

11. Process according to claim 7 in which the gas consists of a mixture of flue gas and air.

12. Process according to claim 7 in which the bulk of the oil is separated from the said catalyst by solvent extraction.

JAMES A. FRANCEWAY.